(12) United States Patent
Arnold, IV et al.

(10) Patent No.: US 8,464,397 B2
(45) Date of Patent: Jun. 18, 2013

(54) SELF-AFFIXING HANDLE

(75) Inventors: John C. Arnold, IV, Philadelphia, PA (US); Stephanie Arnold, Philadelphia, PA (US)

(73) Assignee: John C. Arnold, IV, Philadelphia, PA (US)

( * ) Notice: Subject to any disclaimer, the term of this patent is extended or adjusted under 35 U.S.C. 154(b) by 635 days.

(21) Appl. No.: 12/715,190

(22) Filed: Mar. 1, 2010

(65) Prior Publication Data

US 2010/0293754 A1  Nov. 25, 2010

Related U.S. Application Data

(60) Provisional application No. 61/179,438, filed on May 19, 2009.

(51) Int. Cl.
*B25G 3/32* (2006.01)

(52) U.S. Cl.
USPC ........... 16/422; 16/114.1; 16/406; 16/426; 16/444; 16/446

(58) Field of Classification Search
USPC ........... 16/114.1, 406, 413, 419, 422, 428, 16/444, 446, 426, 427; 297/183.8, 463.1, 297/DIG. 11
See application file for complete search history.

(56) References Cited

U.S. PATENT DOCUMENTS

| | | | |
|---|---|---|---|
| 3,961,431 A * | 6/1976 | Kalenian | 40/665 |
| 4,386,479 A | 6/1983 | Terzian | |
| 5,230,523 A | 7/1993 | Wilhelm | |
| 5,381,617 A * | 1/1995 | Schwartztol et al. | 40/6 |
| 5,692,766 A | 12/1997 | Wheeler | |
| 6,059,301 A | 5/2000 | Skarnulis | |
| 6,098,993 A | 8/2000 | Bellinson | |
| 6,105,998 A | 8/2000 | Baechler | |
| 6,371,055 B1 * | 4/2002 | Lawrence | 119/719 |
| 6,447,001 B1 | 9/2002 | Hsia | |
| 6,578,231 B1 * | 6/2003 | Godshaw et al. | 16/114.1 |
| 6,811,178 B2 | 11/2004 | Tomasi | |
| 6,978,918 B2 * | 12/2005 | Scanlan et al. | 224/148.6 |
| 7,234,722 B1 | 6/2007 | Madigan | |
| 7,309,071 B1 | 12/2007 | Michael | |
| 7,451,561 B2 * | 11/2008 | Weisbart | 40/654.01 |
| 7,934,294 B1 * | 5/2011 | Janes | 16/422 |
| 8,205,579 B2 * | 6/2012 | Pellei | 119/770 |
| 2003/0185018 A1 | 10/2003 | Comrada | |
| 2005/0034343 A1 * | 2/2005 | Weisbart | 40/654.01 |
| 2006/0113737 A1 | 6/2006 | Austin et al. | |
| 2007/0251557 A1 | 11/2007 | Carter et al. | |
| 2008/0238024 A1 | 10/2008 | Heidenreich et al. | |
| 2008/0296326 A1 | 12/2008 | Berlin et al. | |

* cited by examiner

*Primary Examiner* — Roberta Delisle

(57) ABSTRACT

A self-affixing, removable, one-piece handle can be applied and removed from an item, such as a shopping cart, stroller, or the like, or the handle can be applied and removed from any number of items, such as the shoulder straps of a diaper bag or the loop handles of a set of shopping bags, or the like. By being self-affixing, the handle may be attached and removed from the item without the need for tools or any additional items, such as clamps, screws, adhesive, or the like. The handle may provide a link between the shopping cart or stroller and a child. Typical shopping carts or strollers do not provide a suitable location for a child to hold onto while walking alongside. Moreover, a separate, removable, self-affixing handle may be useful to help limit the spread of germs by allowing each child to have their own personal handle.

9 Claims, 2 Drawing Sheets

SELF-AFFIXING HANDLE

CROSS REFERENCE TO RELATED APPLICATIONS

This application claims the benefit of U.S. Provisional Application No. 61/179,438, filed May 19, 2009, herein incorporated by reference.

BACKGROUND OF THE INVENTION

The present invention relates to an apparatus for adding a handle to an item, such as a stroller, shopping cart, diaper bag, shopping bag, or the like and, more particularly, to adding a self-affixing, one-piece, removable handle for a child to hold on to while walking next to a shopping cart or stroller.

Younger children, such 3-5 year olds, may still need to ride in a stroller, but they would sometimes prefer to walk. There may be a new sibling born that needs to ride in the stroller while the child walks along side. In both cases, there is a need for a way to keep the child close while walking along side the stroller.

There are leashes that may attach at one end to the stroller or to an adult. These leashes may attach, at the other end, to the child, typically around the child's wrist. These leashes may have a negative perception to many parents.

Some conventional strollers may include a handle built into a side of the stroller. These types of handles may be permanently attached to the stroller to provide a rigid handle for a child.

As can be seen, there is a need for a simple, self-affixing, removable handle that a parent may easily apply to a stroller, shopping cart, or other similar item to allow the child to hold on to while walking.

SUMMARY OF THE INVENTION

In one aspect of the present invention, a one-piece, self-affixing, removable handle comprises a loop end; an attachment end; and a strap joining the loop end to the attachment end.

In another aspect of the present invention, a method for adding a handle on an object comprises wrapping a strap section of a handle partially around the object; inserting a handle section, attached to a first end of the strap section, through a hole in an attachment section, the attachment section attached to a second, opposite end of the strap section; and pulling the handle section to tighten the handle on the object.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a self-affixing, removable, one-piece handle that can be applied and removed from an item, such as a shopping cart, stroller or the like. In other embodiments, the handle may be used to add a handle to a bag, such as a diaper bag, or to hold a plurality of bags together, such as a plurality of shopping bags. A parent carrying a diaper bag and a number of other bags may join the straps of all of the bags together with the handle of the present invention. By being self-affixing, the handle may be attached and removed from the item without the need for tools or any additional items, such as clamps, screws, adhesive, or the like. The handle may provide a link between the shopping cart or stroller and a child. Typical shopping carts or strollers do not provide a suitable location for a child to hold onto while walking alongside. Moreover, a separate, removable, self-affixing handle may be useful to help limit the spread of germs by allowing each child to have their own personal handle.

Figure 1:
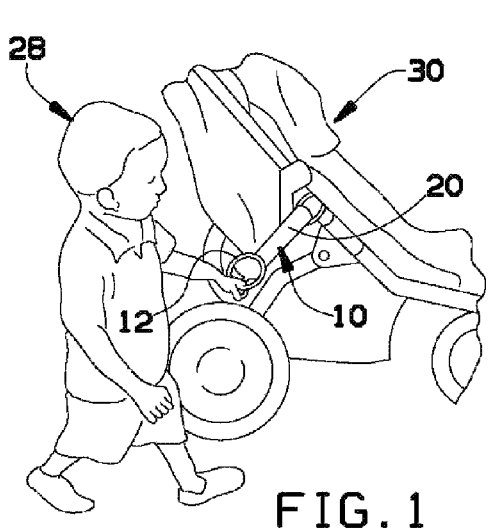
FIG. 1 is a perspective view of a handle according to an embodiment of the present invention in use on a stroller.

Referring to FIG. 1, there is shown a perspective view of a child 28 walking next to a stroller 30. The child 28 may hold onto a loop section 12 of a handle 10. The handle 10 may provide a link between the child 28 and the stroller 30. While FIG. 1 shows the handle 10 attached to a stroller 30, the handle 10 may be attached to various objects where a link between the object and a child may be desired.

Figure 2:
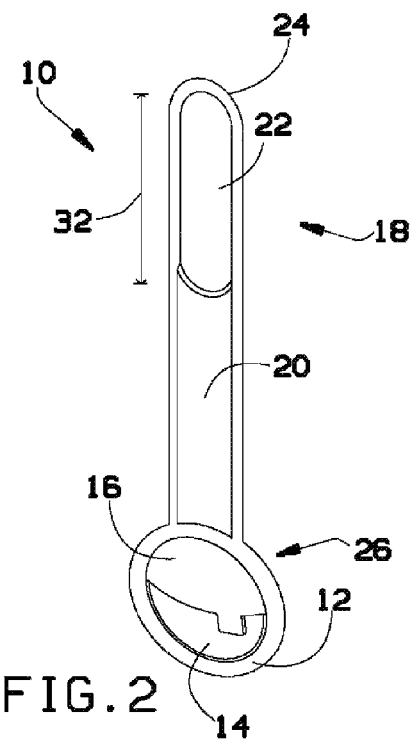
FIG. 2 is a perspective view of the handle of FIG. 1.
Figure 3:
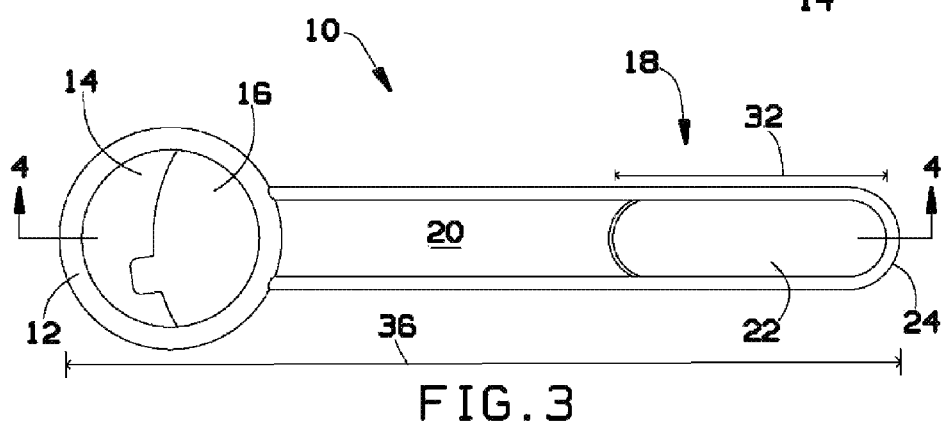
FIG. 3 is a front view of the handle of FIG. 1.
Figure 4:
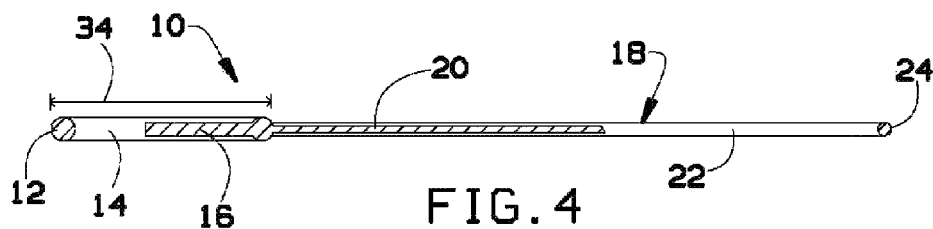
FIG. 4 is a cross-sectional view taken along line 4-4 of FIG. 3.

Referring to FIGS. 2 through 4 various views of the handle 10 are shown. The handle 10 may have an attachment end 18 and a handle end 26. The attachment end 18 may include an opening 22. The attachment end 18 may connect to the handle end 26 through an elongated strap 20. The handle end 26 may include a loop section 12 onto which the child 28 may grasp. The opening 22 may have an opening length 32 that is equal to or greater than a diameter 34 of the loop section 12. This opening length 32 may allow placement and removal of the handle 10, as discussed in greater detail below.

The loop section 12 may be partially filled with a loop section filler 16. The filler 16 may have the same composition as the rest of the handle 10. The filler 16 may result in the handle end 26 having an aesthetically pleasing design, such as a single-toothed smiley face, as shown in FIGS. 2 and 3.

The handle 10 may be made of plastic, rubber, natural woven materials, such as cotton or hemp, man-made woven materials, such as nylon or carbon fibers, or the like, provided that the composition of the handle 10 may be flexible while being strong enough to resist breaking when pulled by a child. The handle 10 may have an overall length 36 between about 10 inches to about 20 inches, typically about 14 to about 15 inches. The loop section 12 may have a diameter 34 from about 2 to about 5 inches. The flexibility of the handle 10 may permit the attached handle to bend when the stroller, shopping cart, or the like, is moved close to a fixed object, such as moving through a door frame, elevator, or the like. Unlike conventional rigid handles, the flexible handle 10, according to an embodiment of the present invention, may not require a wider footprint for maneuvering.

Figure 5:
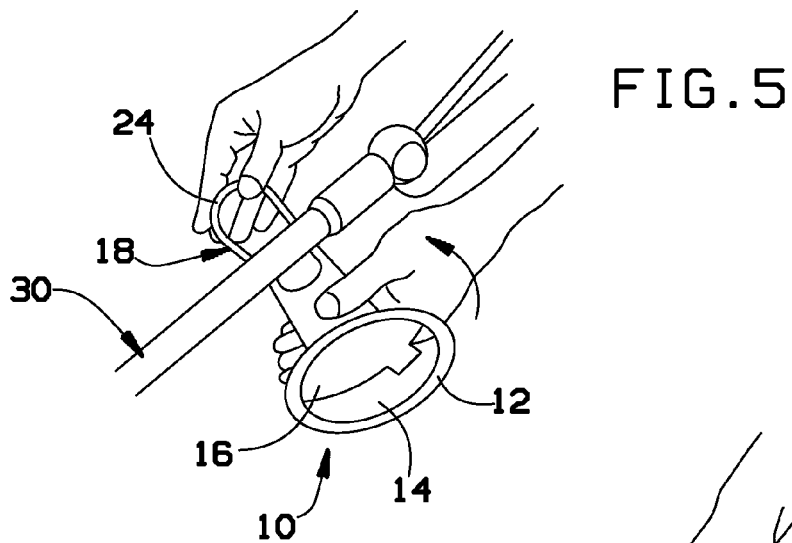
FIG. 5 is a perspective view showing one step in the application of the handle of FIG. 1.
Figure 6:
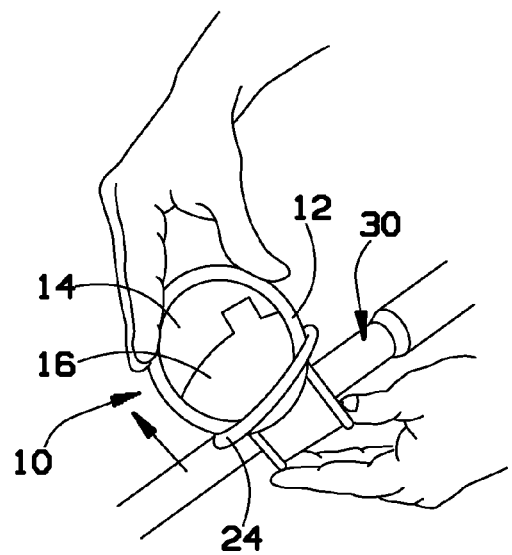
FIG. 6 is a perspective view showing another step in the application of the handle of FIG. 1.
Figure 7:
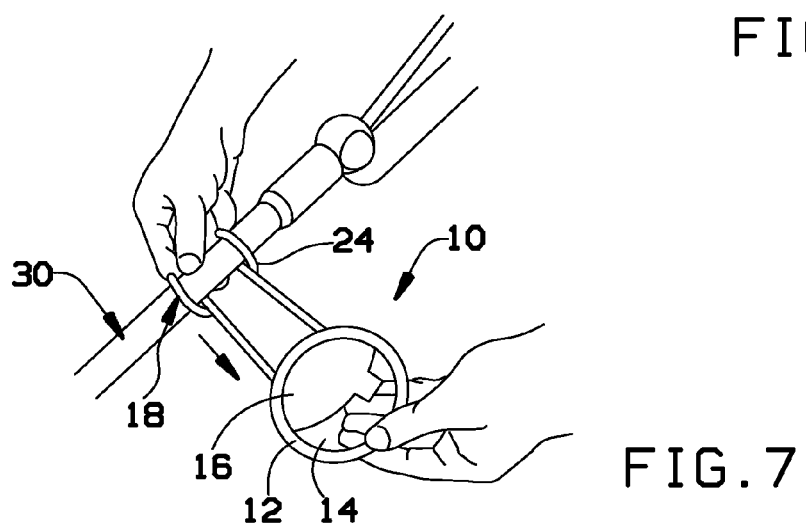
FIG. 7 is a perspective view showing a further step in the application of the handle of FIG. 1.

Referring to FIGS. 5 through 7, there is shown various steps for applying the handle 10 to a stroller 30. The strap 20 of the handle 10 may be wrapped around the stroller 30 (FIG. 5). A distal end 24 of the attachment end 18 may be held by a user while inserting the handle end 26 through the opening 22 (FIG. 6). The user may then pull the handle end 26 to tighten the handle 10 onto the stroller 30 (FIG. 7). One feature of the present invention is that the handle 10 may remain attached to the stroller 30, even when the stroller 30 is folded for storage. The handle 10, attached to the folded stroller, may not take up any additional storage space, providing convenient storage without requiring removal.

While the Figures show the handle end 26 being round, any shape may be possible for the handle end. For example, a rectangular handle end (not shown) may provide a flat side for a child's hand to grasp. In other embodiments, the filler 16 may be absent, providing a handle end 26 having an open loop to form the loop section 12.

While the handle 10 is self-affixing (in other words, does not require any tools or additional items, such a clamp or screw to attach), the handle 10 may be permanently applied to an item, such as a stroller, by any suitable attachment means, including screws, clips, clamps, or the like.

The handle 10 may provide a self-affixing solution for easily adding a handle onto a stroller or shopping cart. The handle 10 may also be useful for securing a number of items, such as looped-handle grocery bags, together. Instead of the stroller 30, a number of shopping bag handles (not shown) may be contained by the handle and then carried all together by the open loop end 12 of the handle. In general, the handle 10 may provide a handle where a handle is lacking (such as on the side of a stroller or shopping cart) or may provide a handle to join a number of items together, allowing them to be carried by a single handle 10.

The handle 10 may be made from various methods including standard injection molding, stitching, weaving and the like.

It should be understood, of course, that the foregoing relates to exemplary embodiments of the invention and that modifications may be made without departing from the spirit and scope of the invention as set forth in the following claims.

We claim:

1. A one-piece, self-affixing, removable handle comprising:
    a loop end, wherein this loop end has a filler in a portion of the loop end
    an attachment end, has an opening
    a strap joining the loop end to the attachment end; and
    pushing the loop end through the attachment end adjustably affixes the handle to an object.

2. The handle of claim 1, wherein the handle is formed from a flexible material.

3. The handle of claim 2, wherein the flexible material is a plastic.

4. The handle of claim 1, wherein the handle is between about 10 to about 20 inches in length.

5. The handle of claim 1, wherein the loop end has a diameter from about 2 to about 5 inches.

6. A method for adding a handle on an object, the method comprising:
    wrapping a strap section of a handle partially around the object;
    inserting a handle section, attached to a first end of the strap section, through a hole in an attachment section, the attachment section attached to a second, opposite end of the strap section; and
    pulling the handle section to tighten the handle on the object.

7. The method of claim 6, wherein the object is selected from the group consisting of a stroller, a shopping cart and a plurality of shopping bag handles.

8. The method of claim 6, wherein the combined strap section, handle section and attachment section is from about 10 to about 20 inches in length.

9. The method of claim 6, further comprising injection molding strap section, handle section and attachment section integrally from a flexible plastic material.

* * * * *